United States Patent
Baker et al.

(10) Patent No.: US 7,426,953 B2
(45) Date of Patent: Sep. 23, 2008

(54) BEAD BREAKER

(75) Inventors: Terry Baker, Gladstone, OR (US); Dan Barton, Gladstone, OR (US)

(73) Assignee: Production Concepts, Inc., Gladstone, OR (US)

( * ) Notice: Subject to any disclaimer, the term of this patent is extended or adjusted under 35 U.S.C. 154(b) by 0 days.

(21) Appl. No.: 11/283,231

(22) Filed: Nov. 18, 2005

(65) Prior Publication Data

US 2006/0151121 A1    Jul. 13, 2006

Related U.S. Application Data

(60) Provisional application No. 60/643,874, filed on Jan. 12, 2005, provisional application No. 60/720,020, filed on Sep. 24, 2005.

(51) Int. Cl.
  *B60C 25/125*    (2006.01)
(52) U.S. Cl. ..................... 157/1.17; 157/1.26
(58) Field of Classification Search ............... 157/1.17, 157/1.26, 1.28, 1.24, 1.2
  See application file for complete search history.

(56) References Cited

U.S. PATENT DOCUMENTS

| | | | | |
|---|---|---|---|---|
| 2,749,975 A * | 6/1956 | Curtis | ........................ | 157/1.26 |
| 3,033,268 A * | 5/1962 | Schaevitz | .................. | 157/1.26 |
| 3,426,827 A * | 2/1969 | Lydle et al. | ................ | 157/1.26 |
| 3,937,265 A * | 2/1976 | Wilson | ........................ | 157/1.2 |
| 4,059,140 A * | 11/1977 | Sedgwick | .................. | 157/1.17 |
| 4,072,178 A * | 2/1978 | Du Quesne | ................ | 157/1.17 |
| 4,102,380 A | 7/1978 | Holder | | |
| 4,121,644 A * | 10/1978 | Boyle et al. | ................ | 157/1.17 |
| 4,676,291 A | 6/1987 | Bolger | | |
| 4,953,606 A | 9/1990 | Brown, Jr. | | |
| 6,289,962 B1 * | 9/2001 | Klein | ........................ | 157/1.17 |
| 6,305,453 B1 | 10/2001 | Zielewicz | | |

OTHER PUBLICATIONS

"10", 13", or 15" Tire Bead Breaker," Speedpartz.com, at least as early as Sep. 14, 2005, 1 page, http://www.shoxskinz.com/beadbreak.htm.
"CH-24 Bead Breaker," tsissg.com, at least as early as Sep. 14, 2005, 1 page, http://www.tsissg.com/product-detail.asp?pid=CH-24.
"TC-610 Bead Breaker," tsissg.com, at least as early as Sep. 14, 2005, 1 page, http://www.tsissg.com/product-detail.asp?pid=TC-610.
"TC-600 Bead Breaker," tsissg.com, at least as early as Sep. 14, 2005, 1 page, http://www.tsissg.com/product-detail.asp?pid=TC-600.
"Tire Changers," AmPro, at least as early as Sep. 14, 2005, 10 pages, http://www.e-tirechangers.com.

* cited by examiner

*Primary Examiner*—D. S. Meislin
(74) *Attorney, Agent, or Firm*—Law Office of Karen Dana Oster, LLC

(57) ABSTRACT

A tire bead breaker for breaking a tire bead between a tire and a rim or wheel to allow for easy removal of the tire from the wheel includes a main chassis, an activator unit, and an actuation arm. In one preferred embodiment, the activator unit is a pneumatic airbag. The activator unit may have a plurality of chambers. In one preferred embodiment, the actuation arm has a transfer section and an engagement section. The transfer section is for transferring movement from the activator unit to the engagement section. The actuation arm is preferably pivotably attached to the main chassis.

11 Claims, 7 Drawing Sheets

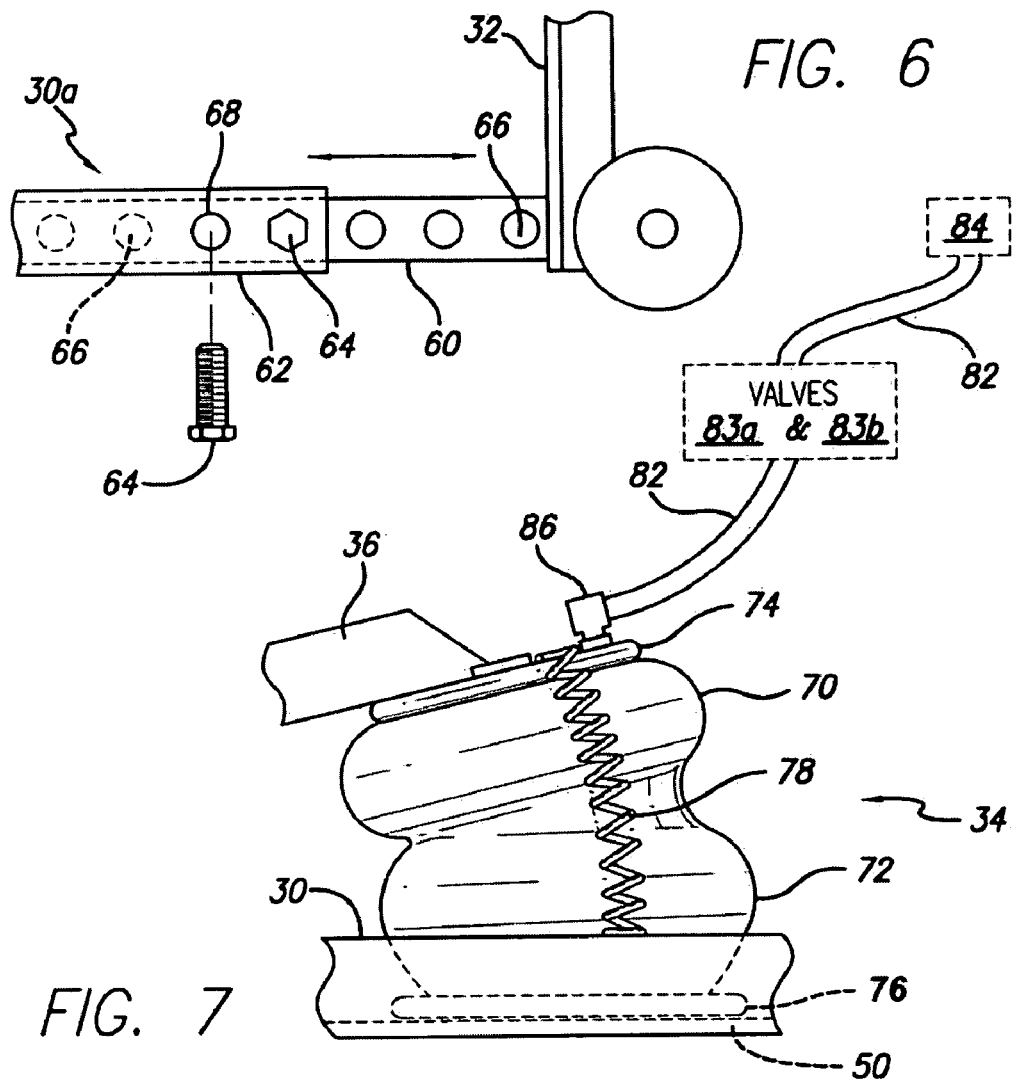
FIG. 6
FIG. 7
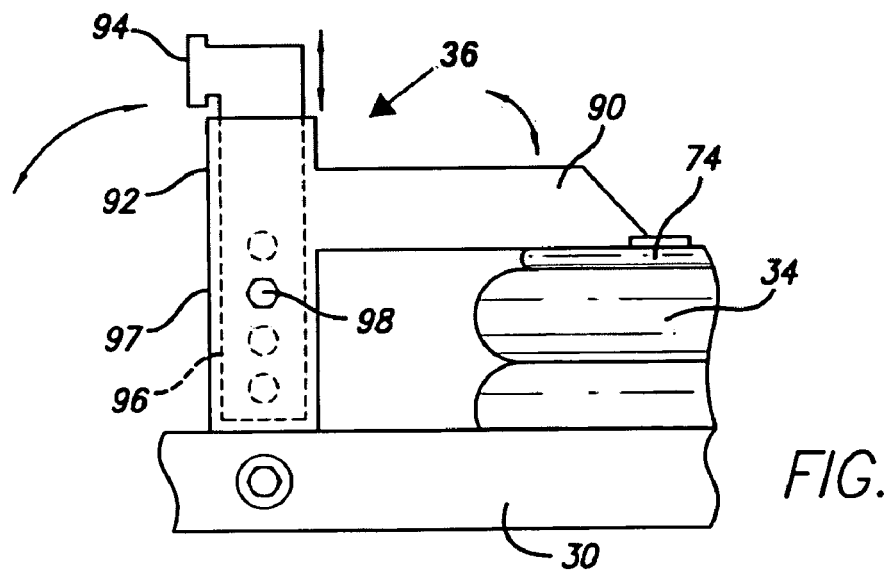
FIG. 8

BEAD BREAKER

The present application is an application claiming the benefit under 35 USC Section 119(e) of U.S. Provisional Patent Application Ser. No. 60/643,874, filed Jan. 12, 2005. The present application is an application claiming the benefit under 35 USC Section 119(e) of U.S. Provisional Patent Application Ser. No. 60/720,020, filed Sep. 24, 2005. The present application is based on and claims priority from these applications, the disclosures of which are hereby expressly incorporated herein by reference in their entirety.

BACKGROUND OF INVENTION

The present invention is directed to a bead breaker for breaking the tire bead between a tire and a rim or wheel.

The tire bead is the inner edge of the tire that contacts the wheel flange and presses against the bead seat. The bead seals against air loss in tubeless tires and grips the wheel rim for transmitting various loads such as steering, traction, and braking. Tire bead failure can cause loss of air pressure in the tire as well as detachment of the tire from the wheel or rim.

The tire bead is a structure composed of high tensile strength steel wire formed into hoops that function as anchors for the tire plies (layers) that hold the tire assembly onto the rim of the wheel. Most tire beads consist of steel (piano-type) wires in parallel in a continuous rubber tape or ribbon, which loosely secures the wires in a soft insulating rubber. The ribbon is wound into a hoop, commonly made of five courses. The end result is a grommet composed of a bundle or stack of wires.

In order to remove a tire from a wheel, the tire bead must be "broken."

Currently all truck tires beads are broken down by hammer and wedge. This task is accomplished by first releasing the air from the tire, then laying the wheel and tire on the ground. The mechanic takes his hammer and wedge and proceeds to strike the tire where it is attached to the wheel (the bead). The mechanic continues to strike at this point until the bead separates from the wheel. The mechanic lifts the wheel and tire, spins it around and lays it down with the opposite side up and begins to repeat the operation until this bead is broken. With this being accomplished, the mechanic can start removing the tire from the wheel.

Several attempts have been made to create a tire bead breaker, but to date they all present one or more difficulties including but not limited to being labor intensive, being relatively dangerous to operate, requiring heavy lifting, being environmentally unsafe, being time consuming, and not being truly portable/mobile.

One example of an attempt to create a tire bead breaker is U.S. Pat. No. 4,102,380 to Holder (the "Holder reference"). The Holder reference discloses a tire bead breaker machine having a frame that includes a pair of upstanding frame members interconnected by a pair of telescopic members. A hydraulic power cylinder moves the upstanding members towards and away from each other by expanding and contracting the telescopic members. In other words, the Holder device expands (opens) and contracts (closes). The expanding and contracting movement of the upstanding frame members requires a significant amount of power that is provided by the hydraulic cylinder. A bead breaker arm includes a pair of hooks on one end, the bottom of which pivotally engages a pin on one of the upstanding members while the other hook movably engages another pin spaced above the first pin to allow the arm to move vertically within limits, the limits being defined by the hook and the opposite end of a curved surface along which the second pin engages as the arm is raised and lowered. The outer free-end of the arm includes a pivotal wedge member having an upwardly curved tapered end for engaging the rim and moving between the tire bead and the rim. The other upstanding frame member includes a rim holder for limiting the rim against vertical movement. A tire support cradle is formed from a plurality of arcuately arranged roller rods connected to one of the upstanding frame members, telescopically and rotatably engaging the other frame member to allow for rotation of the tire and inward and outward movement of the outer upstanding frame member relative to the inner upstanding frame member. To break the tire bead, the hydraulic cylinder contracts to move the upstanding frame members closer together. This forces the tapered end of the wedge between the tire sidewall and the wheel rim to break the tire bead. One problem with the Holder device is that its components (e.g. the upstanding frame members, pair of telescopic members, and the hydraulic cylinder) are heavy and not very maneuverable. Further, the use of the hydraulic cylinder is not environmentally safe.

Another example of an attempt to create a tire bead breaker is U.S. Pat. No. 6,305,453 to Zielewicz (the "Zielewicz reference"). The Zielewicz reference discloses a tire bead breaking apparatus that includes a vertically oriented frame disposed upon a wheeled base. A hydraulically actuated ram is pivotally mounted to the frame. A bead breaking shoe is attached to a distal end of the ram, and engages the beaded edge of a tire mounted upon a swivel pan rotatably mounted to the base. The bead breaking operator is able to simultaneously operate the ram, while rotating the tire disposed upon the swivel pan. The Zielewicz device is designed to work with a tire that lies flat (horizontal) and centered on the swivel pan. This horizontal (flat) positioning of the tire requires significant strength for manipulating heavy tires, both in lowering the tire to a flat orientation and in lifting the tire to a vertical position after the work is complete. Further, the use of the hydraulic cylinder is not environmentally safe.

Yet another example of an attempt to create a tire bead breaker is U.S. Pat. No. 4,953,606 to Brown (the "Brown reference"). The Brown reference discloses a tire bead breaker having a jack stanchion adapted for substantially vertical use, a jack body mounted on the stanchion for substantially vertical movement therealong, a wheel support associated with and movable with the body and extending outwardly substantially horizontally therefrom, the support having a substantially planar bed for supporting a wheel in substantially horizontal posture with a portion of the tire tread juxtaposed with the stanchion such that the side wall thereof faces substantially upwardly, and a butting device affixed to the stanchion above the support and being adapted to engage a tire sidewall adjacent to the tire rim in order to break the tire bead from the rim in response to upward movement of the body and support and a wheel supported thereon. As with the Zielewicz device, the Brown device is designed to work with a tire that lies flat (horizontal). This horizontal (flat) positioning of the tire requires significant strength for manipulating heavy tires, both in lowering the tire to a flat orientation and in lifting the tire to a vertical position after the work is complete.

BRIEF SUMMARY OF THE INVENTION

The present invention is directed to a tire bead breaker for breaking a tire bead between a tire and a rim or wheel to allow for easy removal of the tire from the wheel. The tire bead breaker includes a main chassis, an activator unit, and an actuation arm.

In one preferred embodiment, the activator unit is a pneumatic airbag. The activator unit may have a plurality of chambers.

In one preferred embodiment, the actuation arm has a transfer section and an engagement section. The transfer section is for transferring movement from the activator unit to the engagement section. The actuation arm is preferably pivotably attached to the main chassis.

In one preferred embodiment, the tire bead breaker includes securing apparatus for securing a tire to the main chassis. In the shown exemplary embodiments, the securing apparatus is an adjustable end plate attached at an angle to the main chassis. The main chassis may also have rollers to assist in rotating a vertically positioned tire.

In one preferred embodiment, the tire bead breaker has at least three states: a resting state, a mid-range state, and an engagement state. In the resting state, the activator unit is substantially empty and the actuation arm is in a neutral position such that the engagement section is distanced from the tire. In the mid-range state, the activator unit is partially full and the actuation arm moves in a forward and downward motion such that the engagement section moves closer to the tire. In the engagement state, the activator unit is full enough to cause the engagement section to contact the tire with sufficient force to break the bead.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 6 is a detailed side view of a side piece having an inner slide member and an outer slide member.

FIG. 7 is a detailed side view of a preferred exemplary embodiment of the activator unit as a pneumatic airbag.

FIG. 8 is a detailed side view of a preferred exemplary embodiment of the actuation arm.

DETAILED DESCRIPTION OF THE INVENTION

The present invention is directed to a tire bead breaker 20 for breaking the tire bead 22 between a tire 24 and a rim or wheel 26 to allow for easy removal of the tire 24 from the wheel 26. The tire bead breaker 20 is simple to operate, requires very little labor, is safe, does not require heavy lifting, is environmentally safe, is relatively quick, and is truly portable/mobile. The present invention replaces the labor intensive and relatively dangerous operation of bead breaking with a large hammer. The present invention also decreases the possibility of injury to the mechanic and the equipment. Specifically, the tire bead breaker 20 of the present invention will drastically reduce industrial accidents, equipment damage, and lost time injuries (e.g. from injuries associated with lifting and swinging of a hammer). The tire bead breaker 20 of the present invention is more efficient than prior art devices and methods. For example, the tire bead breaker 20 of the present invention reduces the time it takes to break a tire bead 22.

Although the tire bead 22 is literally the structure composed of high tensile strength steel wire (described above), the tire bead breaker 20 actually breaks the seal between the tire bead 22 and the wheel 26. The term "breaking the bead," "breaking a tire bead," and similar terms will be used throughout to describe breaking the seal.

Figure 1:
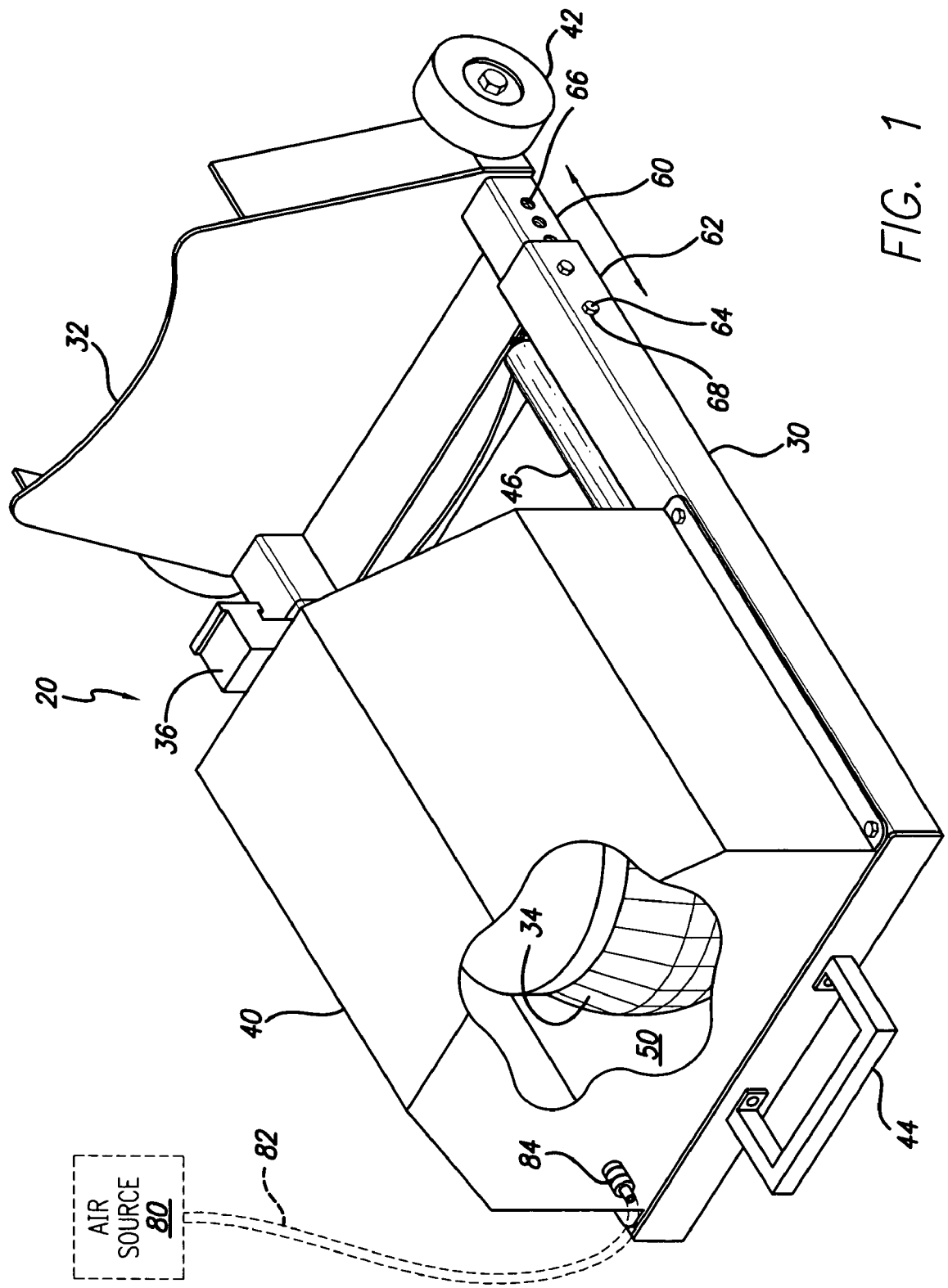
FIG. 1 is a perspective view of an exemplary tire bead breaker of the present invention with a housing partially cutaway to show an activator unit.
Figure 2:
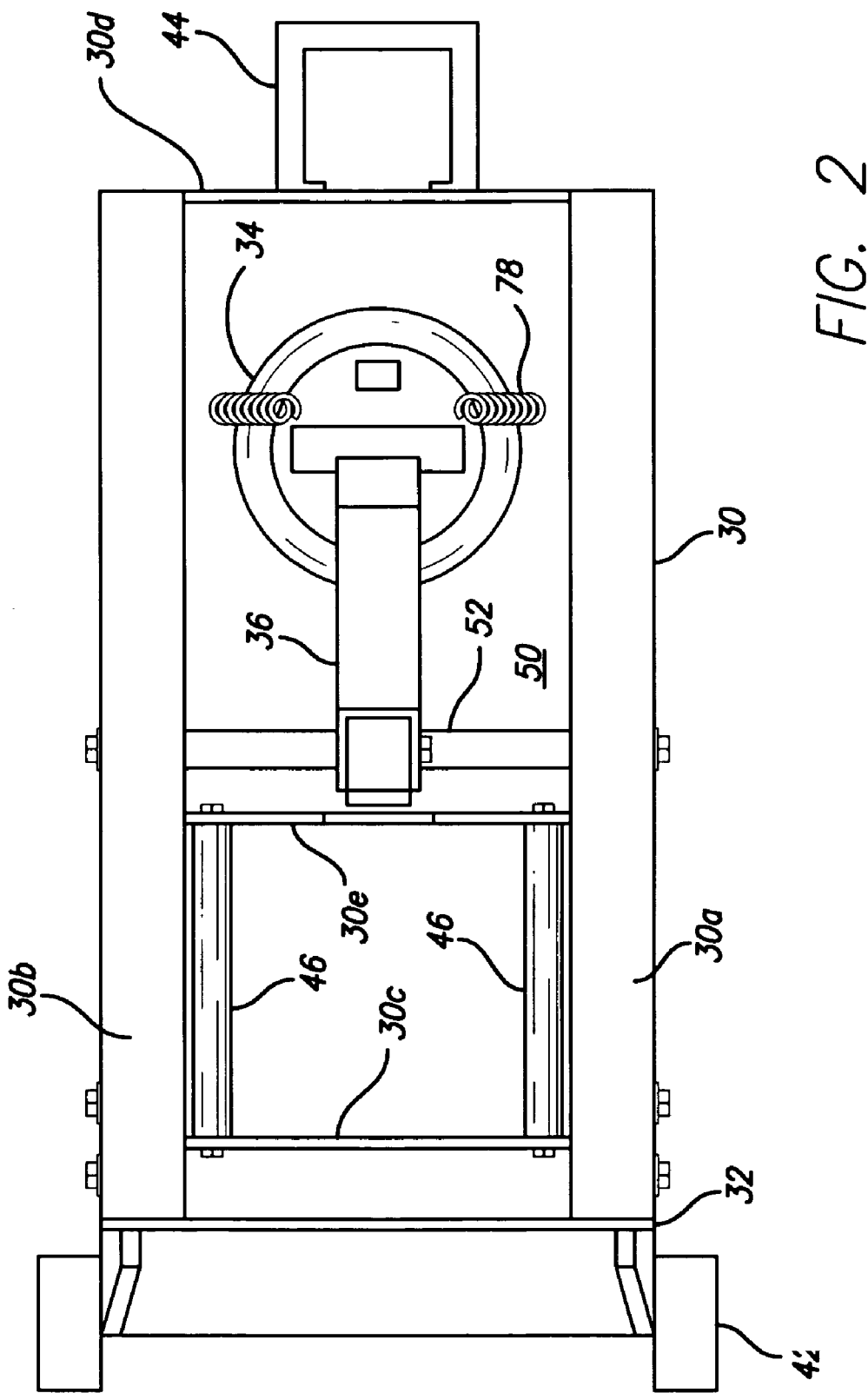
FIG. 2 is a plan view of an exemplary tire bead breaker of the present invention with the housing removed.
Figure 3:
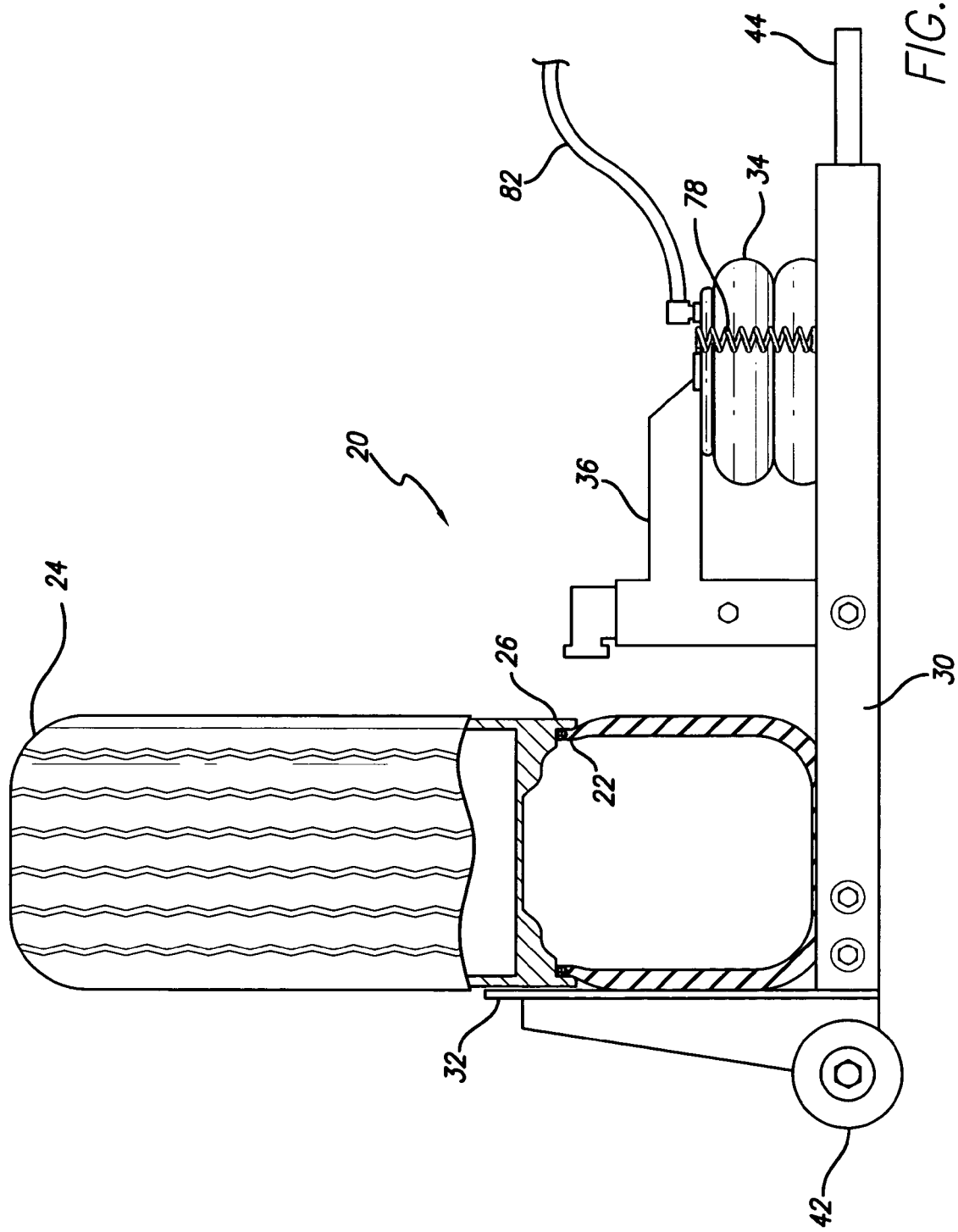
FIG. 3 is a side view of an exemplary tire bead breaker of the present invention with the housing removed, the activator unit being approximately empty and the actuation arm being in its resting position.
Figure 4:
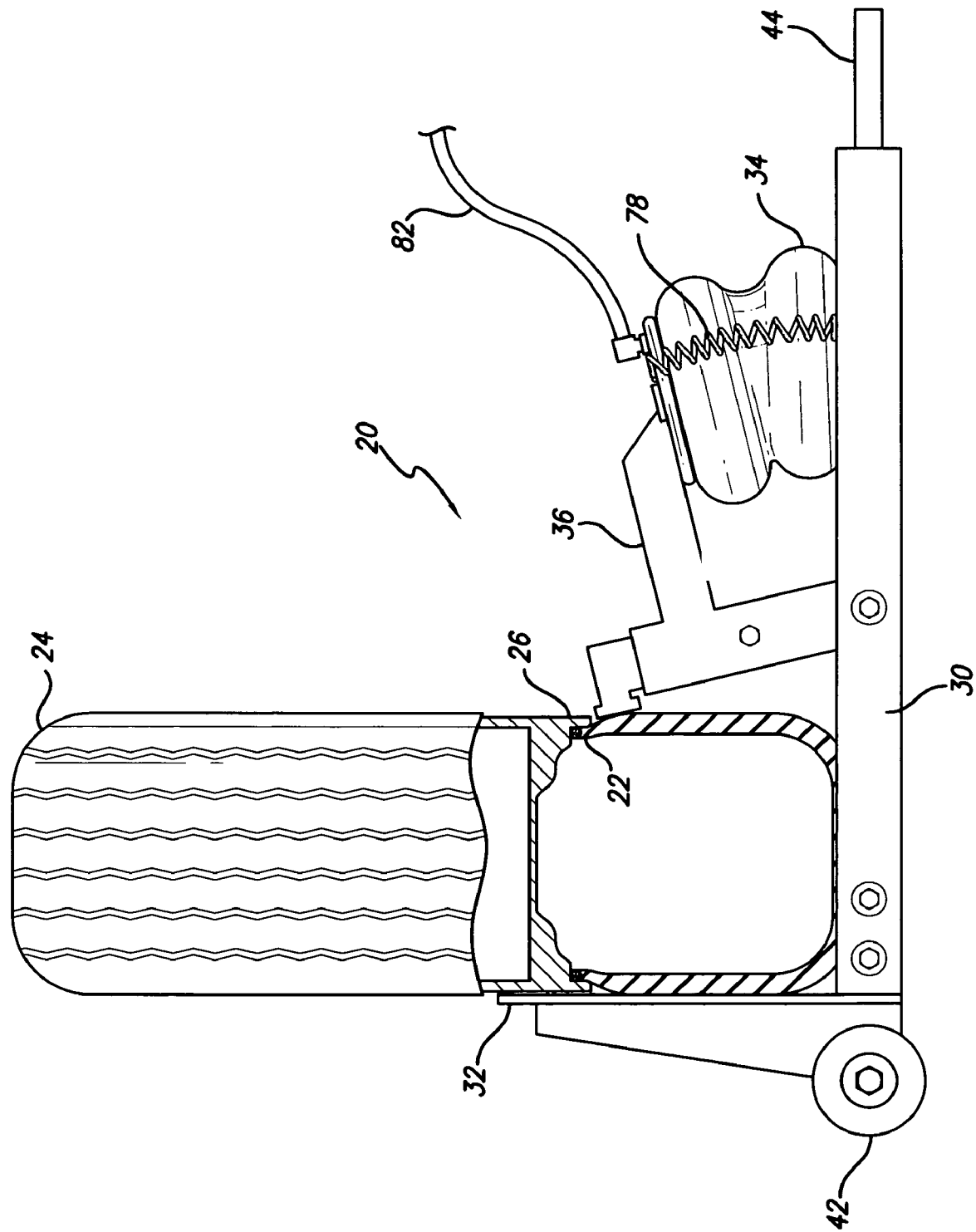
FIG. 4 is a side view of an exemplary tire bead breaker of the present invention with the housing removed, the activator unit being partially full and the actuation arm pivoting further forward and downward.
Figure 5:
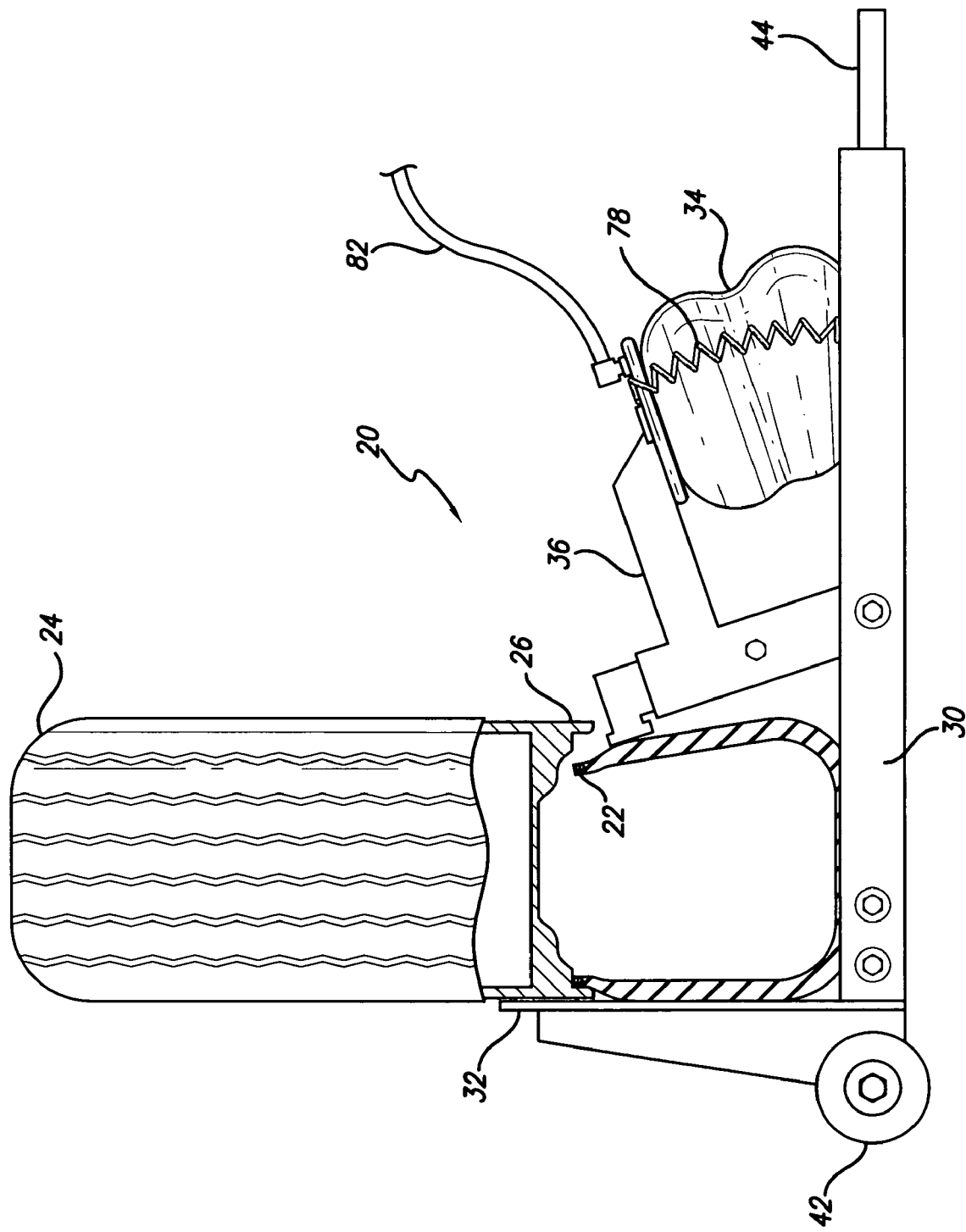
FIG. 5 is a side view of an exemplary tire bead breaker of the present invention with the housing removed, the activator unit being approximately full and the actuation arm being in its activating position and causing the bead to break.

As shown in FIGS. 1-5, the tire bead breaker 20 of the present invention includes a main chassis 30 (that may include two parallel side pieces 30a, 30b (FIG. 2)), an end plate 32, an activator unit 34, and an actuation arm 36. In one preferred embodiment, the activator unit 34 is enclosed in its own compartment (e.g. within a housing 40). In one preferred embodiment, casters 42 and a handle 44 may be provided for easy transport and mobility. In one preferred embodiment, rollers 46 may be attached to the main chassis 30 to assist in rotating the tire 24. FIGS. 3-5 show the progression of the tire bead breaker 20 through a resting state with the activator unit 34 empty (FIG. 3), a mid-range state with the activator unit 34 being partially full (FIG. 4), and an engagement state with the activator unit 34 being full enough to break the bead (FIG. 5).

The exemplary embodiment of the main chassis 30 is shown as a flat frame. As shown in the preferred embodiment of FIG. 2, the main chassis 30 may have two parallel side pieces 30a, 30b that are connected by back and front spanning pieces 30c, 30d as well as an intermediary spanning piece 30e. A floor 50 may fill the void between the side pieces 30a, 30b, the intermediary spanning piece 30e, and the front spanning piece 30d. In the shown embodiment, rollers 46 are attached to the main chassis 30 to assist in rotating the vertical tire 24. Specifically, the rollers 46 are shown as spanning the void between back spanning piece 30c and the intermediary spanning piece 30e such that one end of each roller 46 is pivotably connected to the back spanning piece 30c and the opposite end of each roller 46 is pivotably connected to the intermediary spanning piece 30e. The main chassis 30 may be adjustable to accommodate multiple types of tires 24. For example, the main chassis 30 may be adjustable in width (not shown) or length (discussed below as the adjustability of the end plate 32). It should be noted that the main chassis 30 of the present invention may be constructed as multiple pieces to be interconnected or as a single integral unit.

The exemplary embodiment of the end plate 32 is shown as a substantially flat surface mounted substantially perpendicular to the main chassis 30. The end plate 32 may be removable and/or adjustable so as to be able to accommodate multiple types of tires 24. In the shown embodiment, the end plate 32 is adjustable in that it can be moved to accommodate tires of different widths. For example, wide tires are accommodated by moving the end plate 32 outward (shown as expanded in FIG. 1). By moving the end plate 32 inward (shown as contracted in FIG. 2), narrow tires are accommodated. As shown in detail in FIG. 6, this adjustability is accomplished using two-part side pieces 30a, 30b. Each side piece 30a, 30b has an inner slide member 60 and an outer slide member 62. The inner slide members 60 are able to slide within the respective outer slide members 62. Once the end plate 32 is in the desired position, securing mechanisms 64 (e.g. bolts, pins, or latches) are used to secure the slide members 60, 62 in relationship to each other. In the shown embodiment, bolt securing mechanisms 64 may be pushed or screwed through holes 66, 68 in the slide members 60, 62. The inner slide member 60 is shown as having a plurality of holes 66 so that there is a plurality of positions available. It should be noted that alternative means may be used to accomplish the adjustability of the end plate 32. The end plate 32 may be an alternative securing apparatus that may have features (not shown) to assist in holding, securing, and/or rotating the tire 24.

FIG. 7 is a detailed drawing of a preferred exemplary embodiment of the activator unit 34 as a pneumatic airbag. In the shown exemplary embodiment, the airbag includes dual chambers 70, 72. An upper plate 74 is at the top of the upper chamber 70 and a lower plate 76 (shown in phantom) is at the bottom of the lower chamber 72. The dual chambers 70, 72 expand with the introduction of air and contract as air is released or removed. Although shown with two chambers, any number of chambers could be used so long as expansion and contraction is possible. The upper plate 74 allows for secure attachment to the actuation arm 36. The lower plate 76 allows for secure attachment to the main chassis 30 (shown as floor 50). One or more springs 78 attached to the actuation arm 36 help encourage the resting position of the tire bead breaker 20 (FIG. 3) when the activator unit 34 is empty. The top end of the spring 78 may be attached to the upper plate 74 and the lower end of the spring 78 may be attached to the lower plate 76, floor 50, and/or main chassis 30.

In one preferred embodiment, activation is effectuated by introducing compressed air into the airbag 34. Most shops and trucks have access to compressed air, so this would be a practical means of providing the air. Alternatively, air may be introduced using an air canister or air from a tire 24. Air is shown generically as air source 80. Appropriate hoses 82, valves (e.g. control valve 83a and/or pop off valve 83b), and fittings (e.g. quick release fitting 84 of FIG. 1 and air bag fitting 86 of FIG. 7), and other transfer mechanisms are shown, but are meant to be exemplary. The air source and/or transfer mechanisms may have appropriate mechanisms for introducing the air (turning the air on), maintaining air pressure (holding the air), and releasing air (turning it off and allowing air to vent). Although the air source 80 is shown as being exterior to the tire bead breaker 20, alternative embodiments may have an interior air source 80 (and appropriate controls accessible to the user).

FIG. 8 shows an exemplary embodiment of the actuation arm 36. The actuation arm 36 in the shown embodiment has a transfer section 90 and an engagement section 92. The transfer section 90 transfers the displacement of the activator unit 34 to the engagement section 92. The engagement section 92 contacts (possibly using a shoe 94) the tire bead 22. In the shown embodiment, the actuation arm 36 is "T" shaped such that the T is lying on its side. The bottom of the T is the transfer section 90 and the top of the T is the engagement section 92. It should be noted that the actuation arm 36 may have alternative shapes including, but not limited to an "L" shape.

As shown in FIG. 8, the transfer section 90 and engagement section 92 may be adjustable to accommodate alternative sized tires 24. For example, in the shown embodiment, the engagement section 92 is telescoping. This may be accomplished in a manner similar to the adjustable side pieces 30a, 30b using an inner slide member 96 and an outer slide member 97. The inner slide member 96 is able to slide within the outer slide member 97. Once the engagement section 92 is the desired length, at least one securing mechanism 98 (e.g. bolts, pins, or latches) may be used to secure the slide members 96, 97 in relationship to each other.

In the shown embodiment, the actuation arm 36 is also pivotably attached to the main chassis 30 using a pivoting shaft 52 (FIG. 2). As the actuation arm 36 transfers the displacement of the activator unit 34 to the transfer section 90, the transfer section 90 rises, causing the actuation arm 36 to pivot. The pivoting movement causes the engagement section 92 to move forward (toward the tire 24) and downward (toward the outer edge of the tire 24). This forward, downward motion causes the tire bead 22 to break. The pivoting motion may provide an increase from the "power" input (the pressure of the compressed air) to the "power" output (the pressure exerted on the bead). The exemplary shown pivoting shaft 52 is constructed of ¾" mild steel round bar, encapsulated by 1¼" dom tubing with 0.219" wall.

FIGS. 3-5 show the progression of the tire bead breaker 20 through a resting state (FIG. 3), a mid-range state (FIG. 4), and an engagement state (FIG. 5). FIG. 3 shows the tire bead breaker 20 with the activator unit 34 empty and the actuation arm 36 in its resting or neutral position such that said engagement section 92 is distanced from the tire bead 22. Springs 78 attached to the transfer section 90 help encourage this resting position when the activator unit 34 is empty. As air is added, the quantity of air in the activator unit 34 is increased and the actuation arm 36 pivots forward and downward. FIG. 4 shows the tire bead breaker 20 with the activator unit 34 being partially full (e.g. 30%-60% full) and the actuation arm 36 pivoting further forward and downward. As air is added, the quantity of air in the activator unit 34 is increased and the actuation arm 36 pivots forward and downward. FIG. 5 shows the tire bead breaker 20 with the activator unit 34 being approximately full (or full enough to break the tire bead 22) and the actuation arm 36 pivoting as far forward and downward so as to cause the engagement section 92 to contact the tire with sufficient force to break the tire bead 22.

The shown exemplary embodiment of the tire bead breaker 20 was tested. In the test, compressed air was introduced to the airbag 34, causing the actuation arm 36 to pivot as intended. After several articulations, a truck tire 24 was placed on the unit at the proper location. The airbag 34 again was activated, and the result was positive, breaking the bead in approximately 2 seconds. The tire 24 was reversed, the procedure repeated, and the results were the same. This test was repeated several times that day and the results were that all beads were broken in two seconds to four seconds each.

Figure 9:
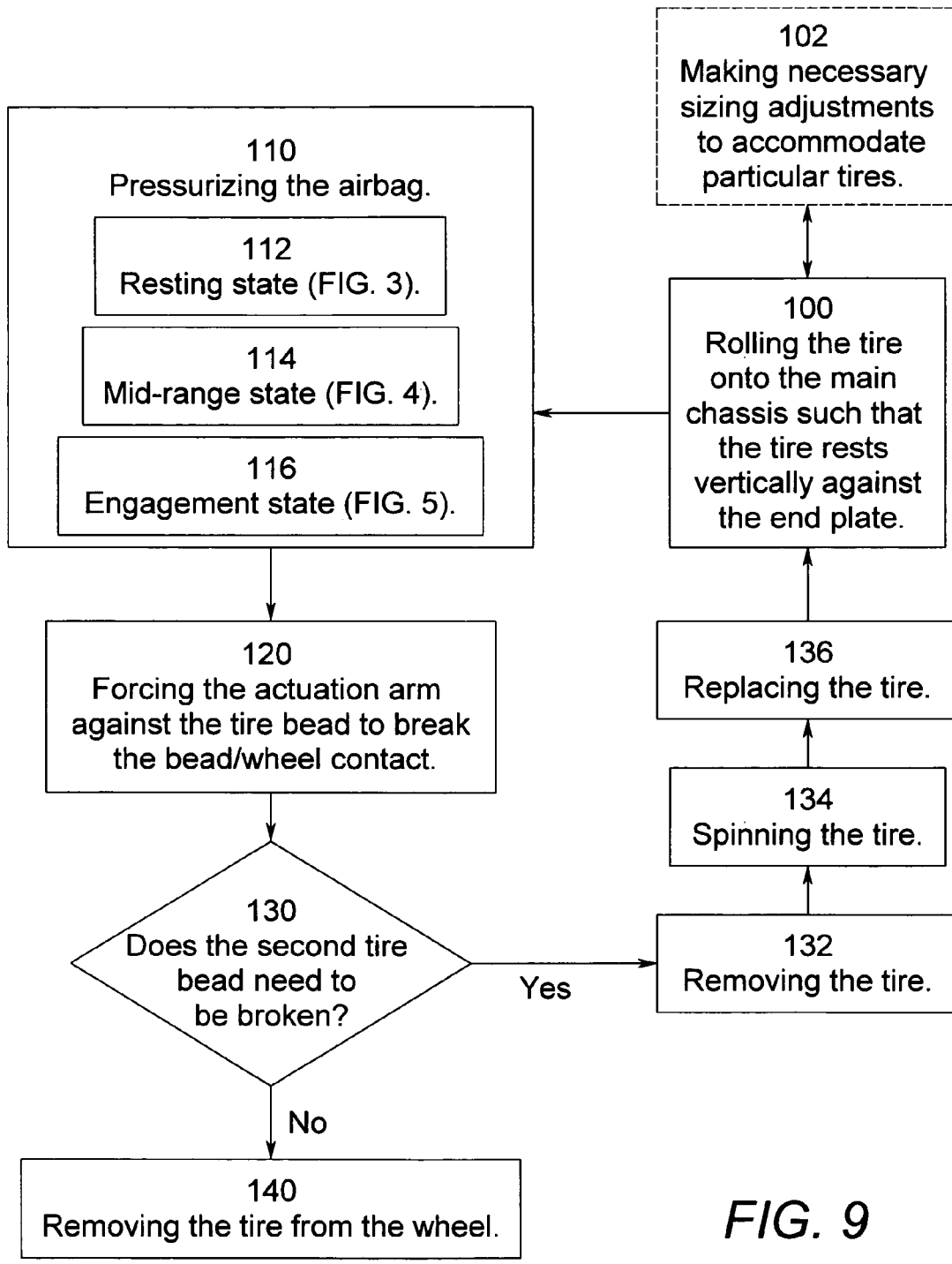
FIG. 9 is a flow chart showing an exemplary method for using a tire bead breaker of the present invention.

FIG. 9 is a flow chart showing an exemplary method for using a tire bead breaker of the present invention. At step 100, the operator rolls the tire 24 onto the platform of the main chassis 30 such that the tire 24 rests vertically against the backing plate (end plate 32). Because the tire can be rolled into position, it does not need to be lifted and/or laid flat. This reduces the strength necessary to use this device. This also reduces injuries associated with lifting and laying flat. Either before or after step 100, the operator may take the optional step 102 of making necessary sizing adjustments to accommodate a particular tire 24. Then, at step 110, the operator pressurizes the airbag 34. The step of pressurizing the airbag 34 causes the bead breaker 20 to go through at least three states (e.g. the resting state (FIG. 3) 112, the mid-range state (FIG. 4) 114, and the engagement state (FIG. 5) 116). At step 120 (which may be concurrent with or the same as step 116), the actuation arm 36 is forced against the tire bead 22 and breaks the bead/wheel contact. After one side is loose, there is the decision step 130 in which it is determined whether the second tire bead needs to be broken. If the answer is yes, the operator removes the tire 132, spins the tire 134, replaces the tire 136 (which may be the same as step 100) in the tire bead breaker 20, and proceeds to break the opposite tire bead (returning to step 110). When both tire beads have been broken, step 140 is performed by removing the tire 24 from the wheel.

This invention works exceptionally well on standard western-style truck wheels, which covers about 80% of the truck tires 24 on the road. An alternative actuation arm 36 will be able to handle standard split rims and military split rims.

The tire bead breaker 20 unit can be used in a stationary shop or for field service applications. The tire bead breaker 20 allows the operator to mobilize at the point of repair, being lightweight (in one preferred embodiment, approximately 95 pounds). The tire bead breaker 20 facilitates easy transport and/or shipping.

Preferred embodiments of the main chassis 30 and end plate 32 may be constructed from extremely durable material such as 10 gauge mild steel. The actuation arm 36 is preferably constructed from extremely durable material such as 2"×2"×0.125 wall square tube. The unit may be powder coated or have other protective coatings thereon.

It should be noted that the size and cross-sectional shape of the main chassis 30 is suitable for rolling a tire into position. The 2" height of the side pieces 30a, 30b is suitable for most intended purposes for most operators and/or tires. However, a flatter frame (e.g. a 1" height) may be used to reduce the strength necessary to roll the tire into position. Also, ramps (not shown) may be added to one or both side pieces 30a, 30b. These ramps may be integral or may be separate components. Further, these ramps may be designed such that they have a first position suitable for transport and a second position suitable for use.

Although the present invention looks similar to the Holder device, the two devices are very distinct. As set forth above, the Holder device discloses a tire bead breaker machine having a frame that includes a pair of upstanding frame members interconnected by a pair of telescopic members. A hydraulic power cylinder moves the upstanding members towards and away from each other by expanding and contracting the telescopic members. In other words, the Holder device expands (opens) and contracts (closes). The expanding and contracting movement of the upstanding frame members requires a significant amount of power which is provided by the hydraulic cylinder. Together, the pair of upstanding frame members, the pair of telescopic members, and the hydraulic cylinder are heavy and not very maneuverable. Further, the Holder bead breaker arm seems to require manual positioning. Finally, the use of the hydraulic cylinder is not environmentally safe.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A tire bead breaker for breaking a tire bead between a tire and a rim or wheel to allow for easy removal of said tire from said wheel, said tire bead breaker comprising:
   (a) a main chassis comprising rollers attached thereto to directly support and assist in rotating a vertically positioned tire having a rotational axis;
   (b) securing apparatus for securing said vertically positioned tire to said main chassis;
   (c) a pneumatic airbag activator unit;
   (d) an actuation arm having a transfer section and an engagement section, said transfer section for transferring movement from the activator unit to the engagement section;
   (e) said engagement section having a first engagement section end and a second engagement section end, said first engagement section end having a shoe with a substantially planar bead engaging face, said second engagement section end pivotably attached to said main chassis; and
   (f) when in a resting state, said activator unit is substantially empty and said actuation arm is in a neutral position such that said engagement section is distanced from said tire bead, said substantially planar bead engaging face being substantially parallel to said engagement section and perpendicular to said rotational axis of said vertically positioned tire;
   wherein said transfer section and said engagement section are arranged at an angle to each other, said planar bead engaging face engages said vertically positioned tire when said activator unit is activated, and said transfer section transfers movement from said activator unit to said engagement section.

2. The tire bead breaker of claim 1 wherein said securing apparatus is an adjustable end plate attached at an angle to said main chassis.

3. The tire bead breaker of claim 1 wherein said activator unit has a plurality of chambers.

4. The tire bead breaker of claim 1, having at least three states:
   (a) said resting state in which said actuation arm is in a neutral position such that said engagement section is distanced from said tire;
   (b) a mid-range state in which said activator unit is partially full and said actuation arm pivots in a forward and downward motion such that said engagement section moves closer to said tire; and
   (c) an engagement state in which said activator unit is full enough to cause said engagement section to contact said tire with sufficient force to break said bead.

5. The tire bead breaker of claim 1, having at least three states;
   (a) said resting state in which said actuation arm is in a neutral position such that said engagement section is distanced from said tire;
   (b) a mid-range state in which said activator unit is partially full and said actuation arm pivots in a forward and downward motion such that said engagement section moves closer to said tire; and
   (c) an engagement state in which said activator unit is full enough to cause said engagement section to pivot into contact with said tire with sufficient force to break said bead.

6. The tire bead breaker of claim 1 wherein, upon activation of said activator unit, said transfer section rises, causing said actuation arm to pivot in relation to said main chassis and said engagement section to move forward and downward.

7. The tire bead breaker of claim 1, further comprising:
   (a) said transfer section being attached both to said activator unit and to said engagement section; and
   (b) said engagement section being pivotably attached to said main chassis.

8. A tire bead breaker for breaking a tire bead between a tire and a rim or wheel to allow for easy removal of said tire from said wheel, said tire bead breaker comprising:

(a) a main chassis for supporting said tire vertically, said main chassis comprising rollers attached thereto to directly support and assist in rotating said tire having a rotational axis;
(b) a pneumatic airbag activator unit;
(c) an actuation arm having a transfer section and an engagement section, said transfer section for transferring movement from the activator unit to the engagement section;
(d) said engagement section having a first engagement section end and a second engagement section end, said first engagement section end having a shoe with a substantially planar bead engaging face, said second engagement section end pivotably attached to said main chassis; and
(e) said tire bead breaker having at least three states:
  (i) a resting state in which said activator unit is substantially empty and said actuation arm is in a neutral position such that said engagement section is distanced from said tire bead, said substantially planar bead engaging face being substantially parallel to said engagement section and perpendicular to said rotational axis of said vertically positioned tire;
  (ii) a mid-range state in which said activator unit is partially full and said actuation arm pivots in a forward and downward motion such that said actuation arm moves closer to said tire bead; and
  (iii) an engagement state in which said activator unit is full enough to cause said actuation arm to pivot into contact with said tire bead with sufficient force to break said tire bead;
  wherein said transfer section and said engagement section are arranged at an angle to each other, said planar bead engaging face engages said vertically positioned tire when said activator unit is activated, and said transfer section transfers movement from said activator unit to said engagement section.

9. The tire bead breaker of claim 8 wherein said activator unit has a plurality of chambers.

10. The tire bead breaker of claim 8 wherein, upon activation of said activator unit, said transfer section rises, causing said actuation arm to pivot in relation to said main chassis and said engagement section to move forward and downward.

11. The tire bead breaker of claim 8,
(a) said transfer section being attached both to said activator unit and to said engagement section; and
(b) said engagement section being pivotably attached to said main chassis.

* * * * *